UNITED STATES PATENT OFFICE.

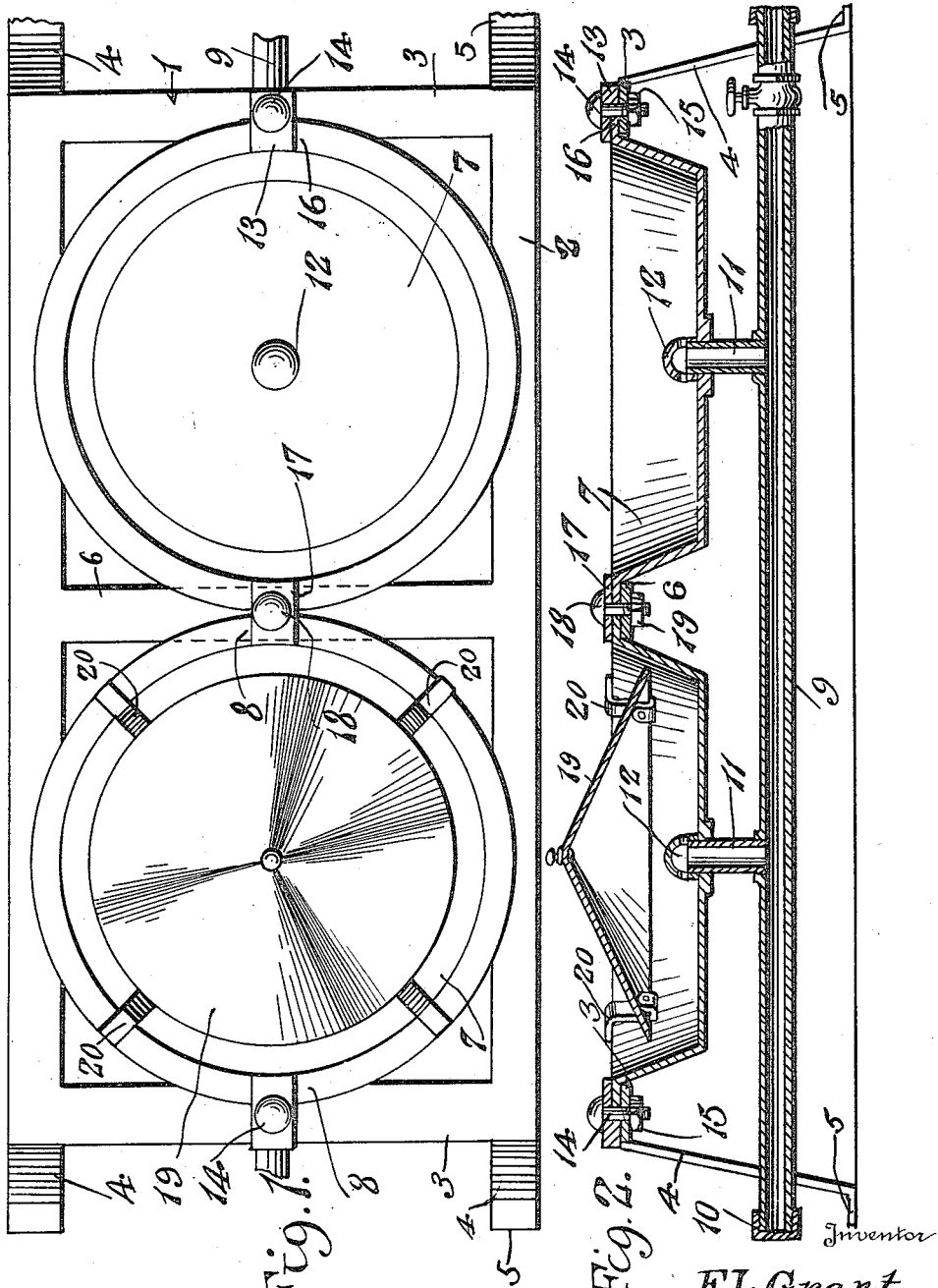

EUGENE L. GRANT, OF NAPA, CALIFORNIA.

STOCK AND POULTRY WATERING DEVICE.

1,214,455.     Specification of Letters Patent.     Patented Jan. 30, 1917.

Application filed May 19, 1914. Serial No. 839,494.

*To all whom it may concern:*

Be it known that I, EUGENE L. GRANT, a citizen of the United States, residing at Napa, in the county of Napa and State of California, have invented certain new and useful Improvements in Stock and Poultry Watering Devices, of which the following is a specification.

My invention comprehends new and useful improvements in devices for watering stock and poultry and has for its primary object to provide a device consisting of a frame supporting a number of pans or like receptacles to contain the water, and a pipe connected with a suitable source of water supply and with the receptacles or pans so that a continuous flow of water to the receptacles may be had, thus providing fresh water and eliminating collection of dirt and other foreign matter in the receptacles.

Another object of importance is to provide novel means to securely clamp the receptacles in the frame.

My invention further aims to improve watering devices so as to render them more practical, simple as to construction, sanitary and efficient and inexpensive to manufacture.

The above and additional objects are accomplished by such means as are illustrated in the accompanying drawings, described in the following specification and then more particularly pointed out as claimed.

With reference to the drawings, wherein I have illustrated the preferred embodiment of my invention as it is reduced to practice, and throughout the several views of which similar reference numerals designate corresponding parts, Figure 1 is a top plan view of my improved watering device, and Fig. 2 is a longitudinal sectional view showing the water supply pipe broken away.

Referring to the drawings by characters of reference, the numeral 1 designates as an entirety a stand or skeleton frame consisting of side bars 2, end bars 3 and preferably four supporting legs 4 that are provided at their lower ends with right angularly extending flanges or feet 5. A transverse bar 6 is secured at its ends to the side bars 2 centrally the ends thereof, so as to provide spaces to receive pans or receptacles 7. The pans 7 are mounted so that their laterally extending and peripheral flanges 8 rest upon the upper faces of the bars 2, 3 and 6, as shown in Fig. 2 in the drawings and are thus supported. Mounted longitudinally of the frame beneath the pans 7 is a watering feed pipe 9 capped at one end as at 10 and at its other end suitably connected with a source of water supply (not shown).

Short pipe lengths 11 extending upwardly from the pipe 9 serve to connect the pans 7 with the pipe 9, the upper ends of the pipe lengths 11 being extended through the bottom walls of the pans 7. A semispherical cap 12 is mounted over the upper end of each of the pipes 11 and is provided with openings or perforations to permit water to flow into the pans. The caps 12 prevent foreign matter from stopping up the pipes 11. It will be readily seen that a continuous flow of water to the pans may be had, thus insuring complete sanitation and a fresh supply of water as foreign matter is prevented accumulating within the pans.

As a means for securely clamping the pans 7, or better, the flanges 8 thereof to the bars 3 and 6, I provide clamping plates 13 for the end bars 3 that are approximately rectangular and have bolts 14 inserted centrally therethrough. The bolts 14 extend through the bars 3 and have nuts 15 turned on their lower terminals. The plates 13 are provided with reduced inner ends 16 that are designed to fit upon the upper faces of the flanges 8 on the pans so that the flanges 8 are clamped between the plates 13 and bars 3. By adjusting the nuts 14 the clamping action may be regulated.

Upon the bars 6 I provide a relatively flat clamping plate 17 that is provided with a central aperture to receive a bolt 18 similar to the one 14 and extending through the bar 6. A nut 19 is turned on the lower end of the bolt 18. The plates 17 are designed to engage the upper faces of the flanges 8 on both pans. It will be readily seen that the pans 7 are securely clamped in operative position in the frame and are prevented from derangement.

I provide a frusto-conical cover or lid 19 for each pan. The frusto-conical lids are supported by angular brackets 20 that are secured to the peripheries of the lids and extend upwardly and outwardly to coöperate with the flanges on the pans. These brackets 20 serve to support the lids 19 within the pans so that the lower edges of the lids are disposed below the upper edges of the pans. The lids 19 are of less diameter than the pans and are spaced circumferentially sufficiently to allow the water to overflow the lids. The lids 19 are to be used preferably when the device is to be employed for watering poultry only. The brackets 20 are practically L-shaped and provided with extensions that are apertured and secured to the lids 19. It is to be understood that the frame may be of any length desired so that a greater number of pans as shown in the drawings may be supported and supplied with water. The stand or frame 1 is of sufficient height to enable stock to readily water and low enough to permit poultry to as easily water. The legs 4 may be formed integral, if desired, with the stand.

In practice, I have found that the form of my invention, illustrated in the drawings and referred to in the above description, as the preferred embodiment is the most efficient and practical; yet, realizing that the conditions concurrent with the adoption of my device will necessarily vary, I desire to emphasize the fact that various arrangements of parts may be resorted to, when required, without sacrificing any of the advantages of my invention, as set forth.

What is claimed is:—

A watering trough of the class described comprising a frame having spaced integral side and end bars, a central transverse bar formed integrally with the side bars and defining a plurality of squared pan receiving openings, the ends of said side bars being bent downwardly and outwardly forming supporting legs, a plurality of pans positioned in said pan receiving openings, said pans provided with an annular laterally extending peripheral flange, portions of said flanges resting upon the upper side of said side and end bars and transverse bar, a plurality of fastening plates arranged upon portions of said pan flanges and the upper side of the end bars and transverse bar and means extending through said plates and bars to hold the pans against movement with relation to the frame in any direction.

In testimony whereof I affix my signature in presence of two witnesses.

EUGENE L. GRANT.

Witnesses:
 EVERETT WILLIAMS,
 ENSIGN H. KING.

Copies of this patent may be obtained for five cents each, by addressing the "Commissioner of Patents, Washington, D. C."